Dec. 6, 1960 N. B. JAGEMANN 2,963,122
COLLAPSIBLE UTILITY HOUSE
Filed Sept. 13, 1957 5 Sheets-Sheet 1

Inventor.
Nicholas B. Jagemann.
By Byron Hume Groen & Clement
Attys.

Dec. 6, 1960    N. B. JAGEMANN    2,963,122
COLLAPSIBLE UTILITY HOUSE
Filed Sept. 13, 1957    5 Sheets-Sheet 2
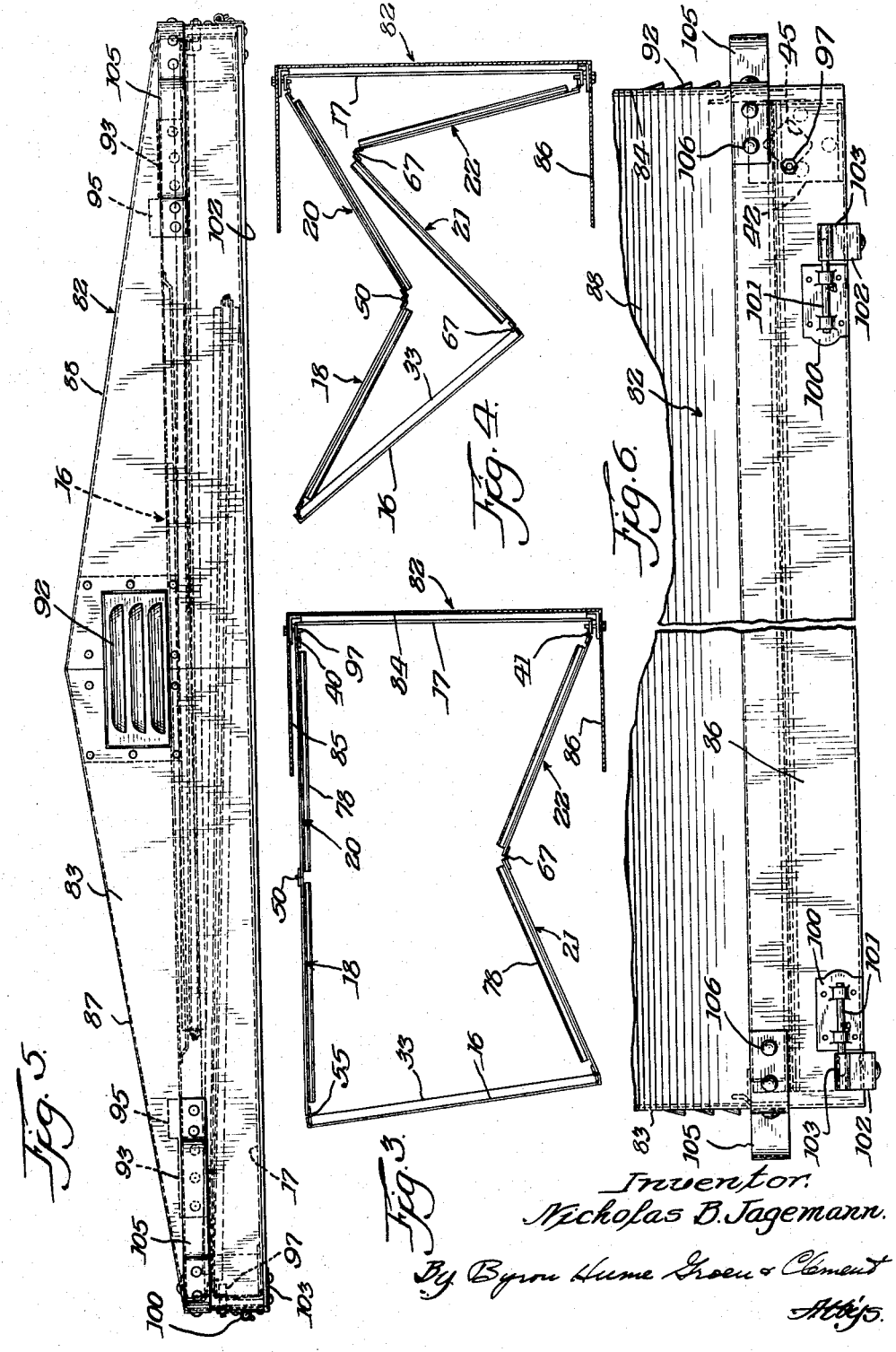
Inventor:
Nicholas B. Jagemann.
By Byron Hume Groen & Clement
Attys.

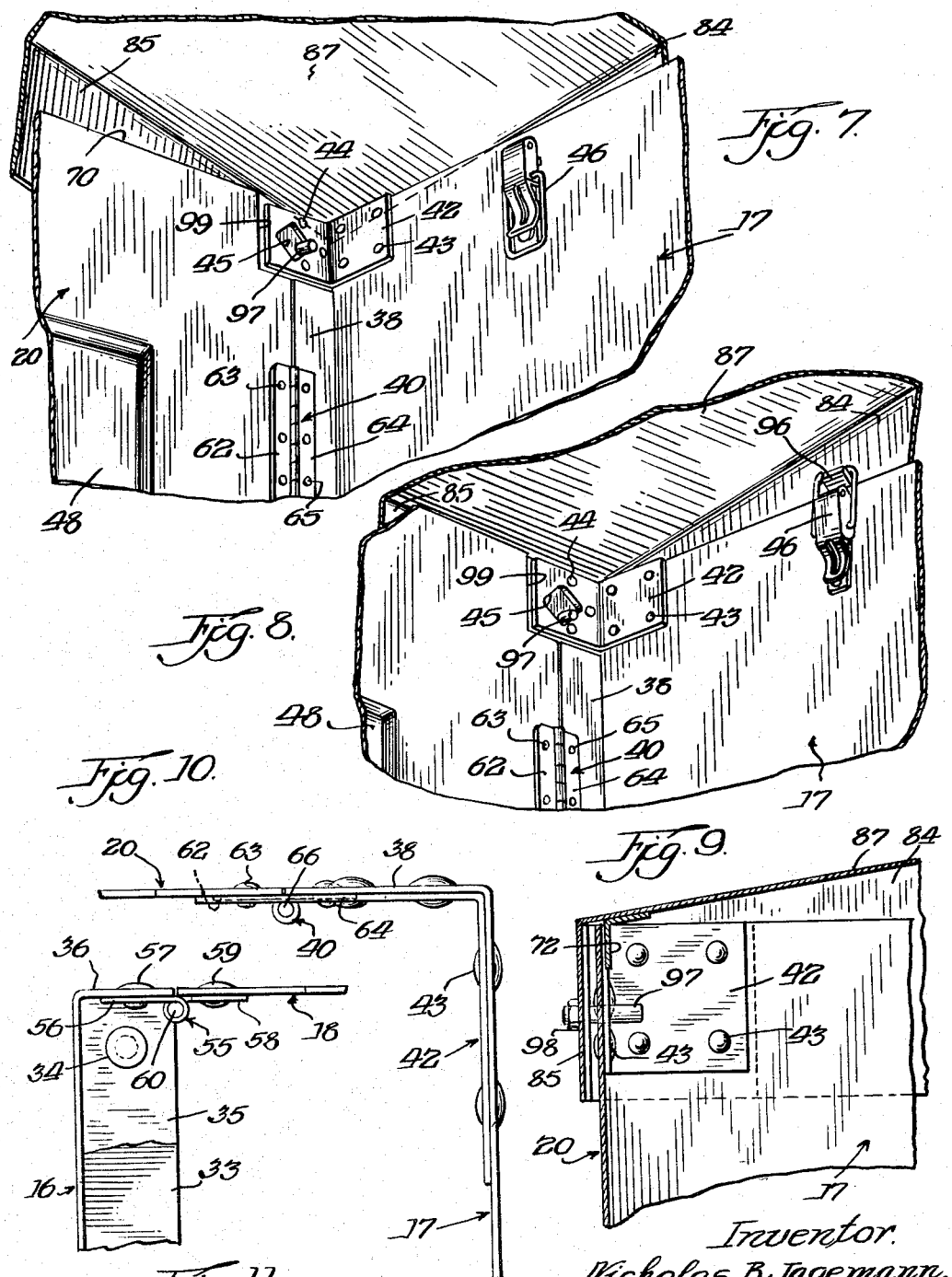

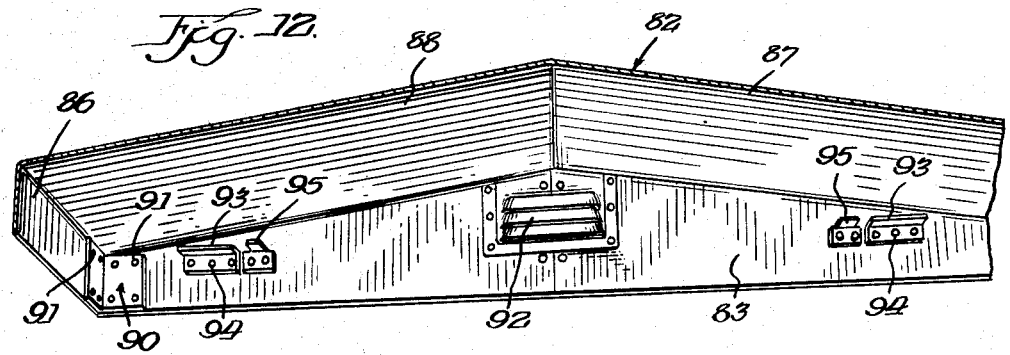
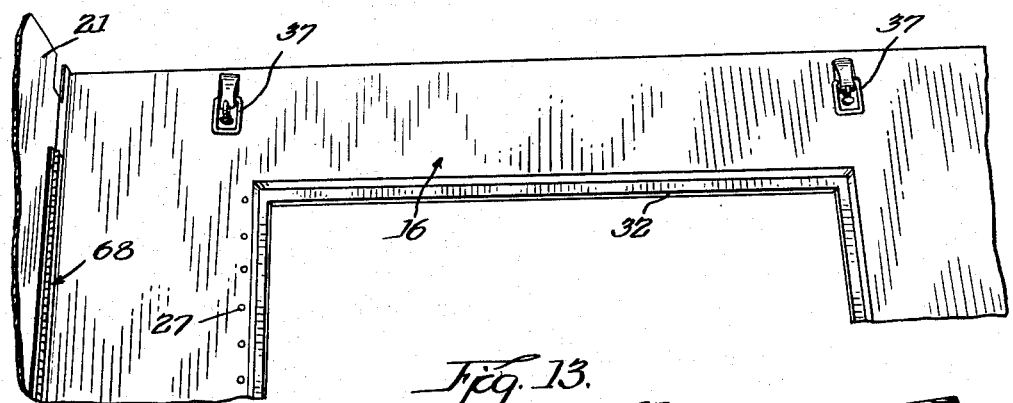
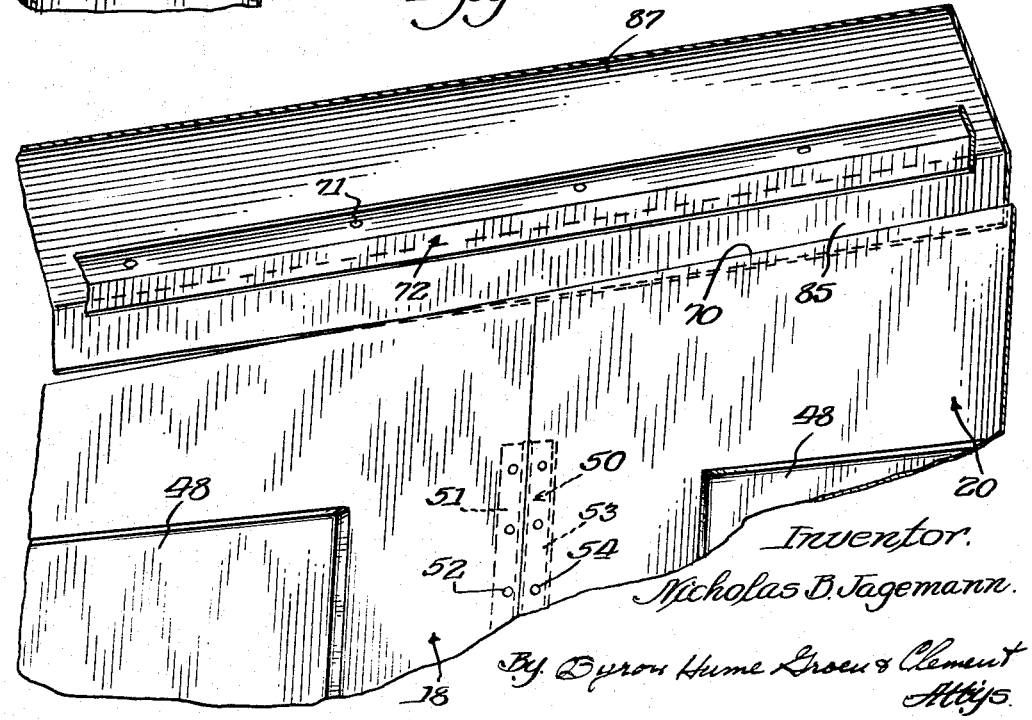

Dec. 6, 1960   N. B. JAGEMANN   2,963,122
COLLAPSIBLE UTILITY HOUSE
Filed Sept. 13, 1957   5 Sheets-Sheet 5
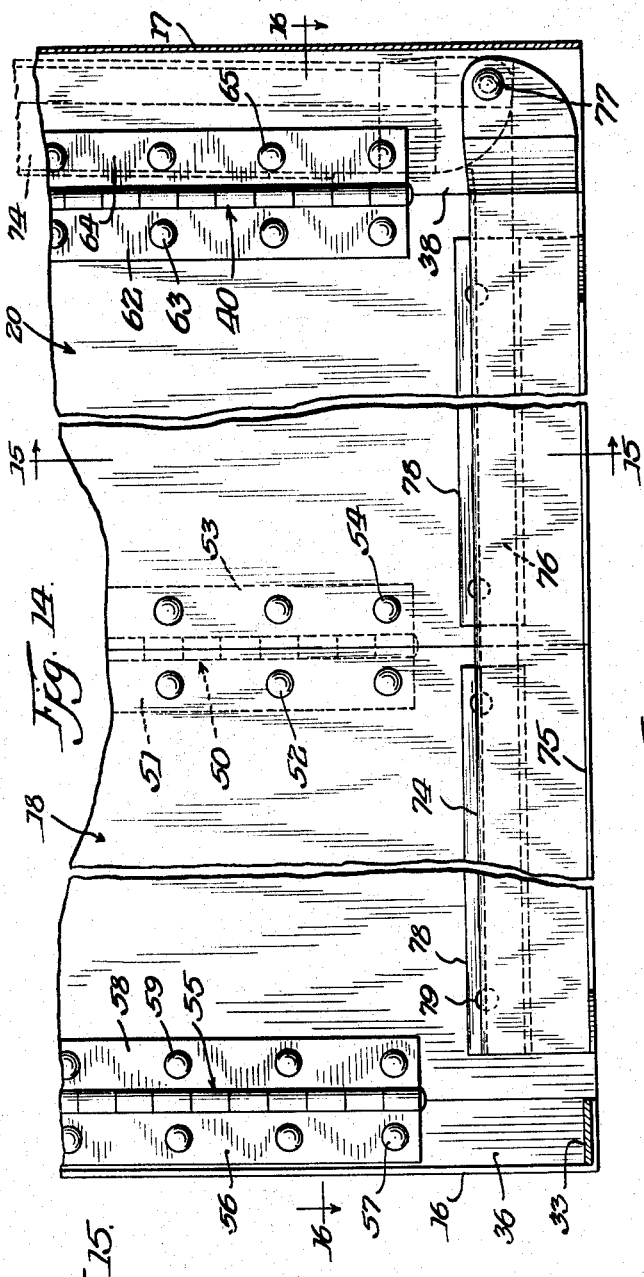
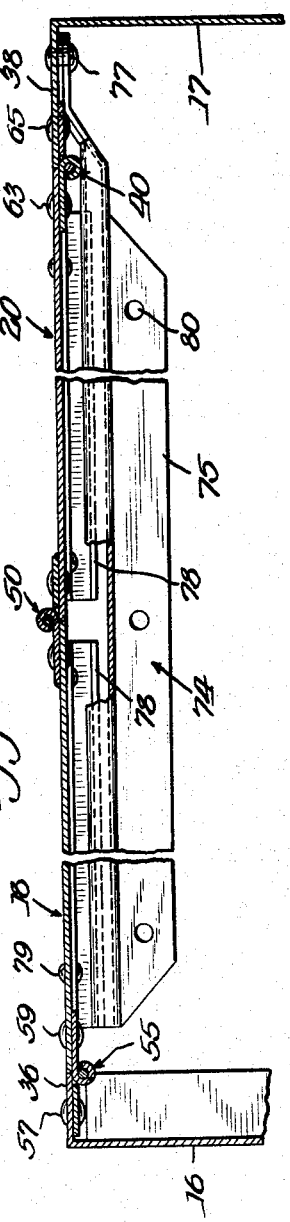
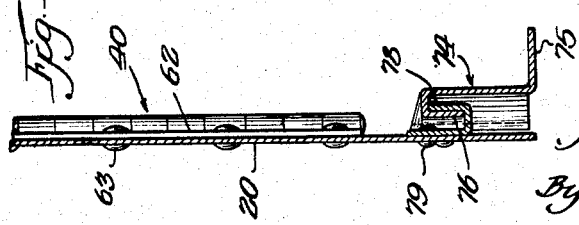
Inventor:
Nicholas B. Jagemann.
By Byron Hume
Groen & Clement
Attys.

United States Patent Office 2,963,122
Patented Dec. 6, 1960

2,963,122
COLLAPSIBLE UTILITY HOUSE

Nicholas B. Jagemann, Manitowoc, Wis., assignor to Mirro Aluminum Company, Manitowoc, Wis., a corporation of New Jersey Filed Sept. 13, 1957, Ser. No. 683,803

7 Claims. (Cl. 189—2)

The invention relates to utility houses of the type which may be used for storing garden tools and the like or which may be used for shelter such as an ice fishing hut or for service such as a ticket office or a child's playhouse, and in connection therewith the invention has reference in particular to a metal utility house that can be easily erected and collapsed in a few minutes and wherein tools are not required for this operation.

Accordingly, the invention has for a general object the provision of a utility house of the collapsible and portable type, which can be easily and quickly erected by the operator without the use of tools and which, when erected, will be attractive in appearance and rugged in construction.

Another object of the invention is to provide a metal utility house of the collapsible and portable type, wherein all component parts including the side, front and rear walls and roof are pivotally joined together so that upon erection of the structure the several parts will line up accurately and whereby the structure is maintained in erected condition by relatively simple interlocking means.

Another and more specific object is to provide a collapsible and portable utility house having side walls formed by a pair of panels and which are pivoted to each other along their inner edges and to the front and rear walls, respectively, along their outer edges so that the side walls collapse with panels folding against panels or against the front or rear walls to form a compact folded structure when the house is in collapsed condition.

Another object of the invention is to provide a collapsible and portable utility house having side walls pivotally connected to front and rear walls, and wherein all the walls collapse and fold into a gabled roof section which is in turn pivoted to the rear walls.

A further object resides in the provision of a novel hinge connection between the gabled roof section and the rear wall panel, the hinge connection providing for limited relative movement between the parts so that the walls in folded collapsed condition can be located within the gabled roof section with the rear wall panel forming a bottom wall for the collapsed structure.

Another object is to provide a collapsible and portable utility house having a gabled roof section and having side walls pivotally connected to front and rear walls respectively, and wherein all the walls fold against each other for collapsing the structure and which is then folded into the roof section to form a unitary and convenient article for transporting purposes.

A further object of the invention is to provide channels for interlocking with the hingedly connected panels of the side walls for strengthening the side walls and for holding the panels in alignment when the house is in erected condition. Each channel has a pivoted connection with the rear wall of the house and for collapsing the structure the channels are folded upwardly into the corners of the rear wall.

With these and other objects in view, the invention may consist of certain novel features of construction and operation, as will be more fully described and particularly pointed out in the specification, drawings and claims appended hereto.

In the drawings which illustrate an embodiment of the device, and wherein like reference characters are used to designate like parts—

Figure 3 is a sectional view taken substantially along line 3—3 of Figure 2 and illustrating the first step of folding the side panels inwardly for collapsing the structure, with the roof section first being raised to the dotted line position of Figure 2;

Figure 4 is a sectional view similar to Figure 3 but showing both side walls folded inwardly for collapsing the utility house of the invention;

Figure 5 is a front elevational view of the gabled roof section showing in dotted lines the side, front and rear panels in folded relation within said roof section;

Figure 6 is a fragmentary side elevational view of the gabled roof section and illustrating the details of a sliding bolt for locking the rear wall;

Figure 7 is a fragmentary perspective view showing the hinge structure for connecting the roof section to the rear wall and which is in a position providing for pivotal movement of the roof section;

Figure 8 is a view similar to Figure 7 but showing the position of the parts when the utility house is fully erected;

Figure 9 is a fragmentary sectional view taken along line 9—9 of Figure 2;

Figure 10 is a view showing details of the hinge structure for joining a side panel to the rear wall;

Figure 11 is a view showing details of the hinge structure for joining a side panel to the front wall;

Figure 12 is a fragmentary perspective view from inside the utility house showing the roof section in raised position;

Figure 13 is a fragmentary perspective view also from inside the house showing the interlocking means between the roof section and the side panels;

Figure 14 is a fragmentary longitudinal sectional view showing the interlocking channels for holding the pivoted panels of the side walls in longitudinal alignment when the house is erected;

Figure 15 is a vertical sectional view taken substantially along line 15—15 of Figure 14; and Figure 16 is a horizontal sectional view taken substantially along line 16—16 of Figure 14.

Figure 1:
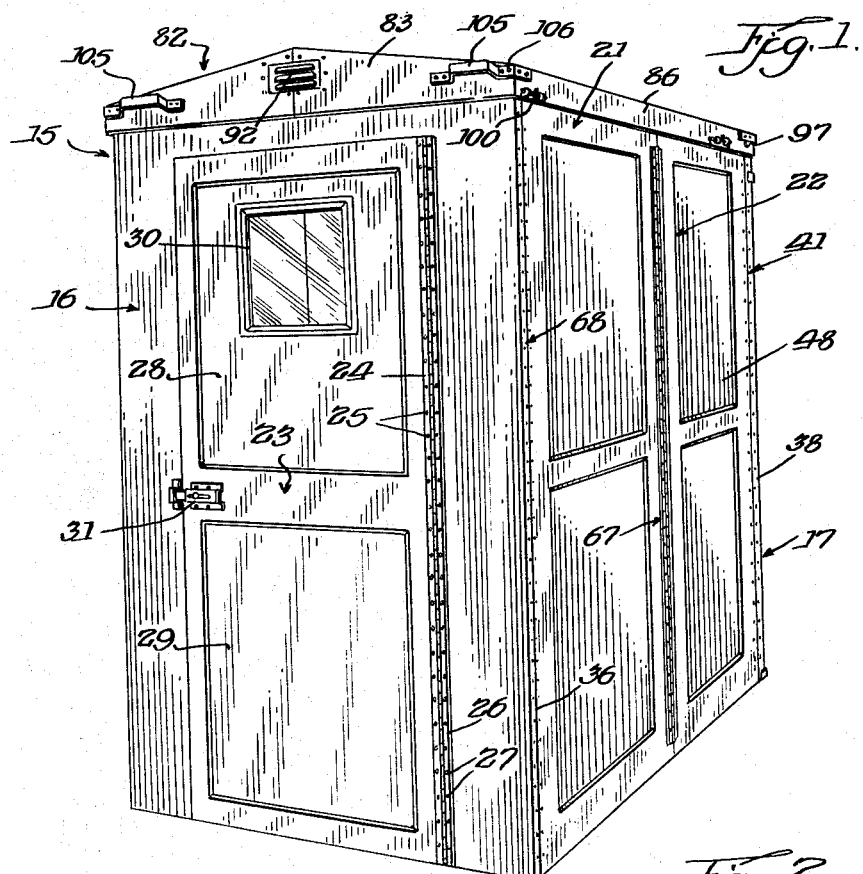
Figure 1 is a perspective view of the utility house of the invention showing the same erected and illustrating certain structural details of the door panel and of the side panels.
Figure 2:
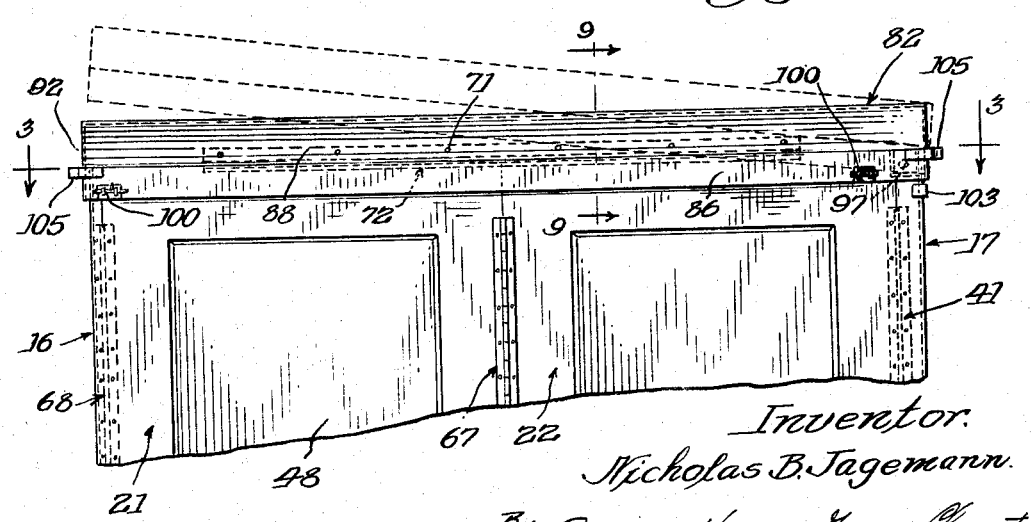
Figure 2 is a fragmentary side elevational view showing the gabled roof section and its connected relation with the front, rear and side walls.

Referring to Figures 1 and 2, the utility house 15, selected for illustrating the invention, essentially consists of a front wall panel 16, a rear wall panel 17, and side walls, each including panels such as 18—20, Figure 13, and 21—22, Figure 1. The front wall of course is provided with a door 23 which is hinged along its right edge by a piano type hinge and which consists of a member 24, riveted as at 25 to the door, and a member 26, riveted as at 27 to the front panel. A pivot pin, which is not seen, connects the members. The door has recessed sections 28 and 29 to enhance its decorative appearance and in the upper section 28 a window 30 is located. Any conventional type of door latch, such as 31, may be employed. Since the door opening 32, Figure 12, extends clear to the bottom of the front wall the said wall is reinforced by a bottom strip such as 33, as shown in Figure 11, and which is secured by rivets 34 to the base flanges 35. The front panel 16 is additionally provided with rearwardly directed side flanges identified by numeral 36. Adjacent the top edge of the front panel, as best shown in Figure 12, the same is provided with latch members 37 for convenient latching with the roof section as will be presently described.

The back or rear wall 17, Figures 7 and 8, consists of a panel which is flat throughout but which has formed thereon the side flanges 38 for receiving hinge structures such as 40 and 41 by means of which the side walls are pivotally secured to the said rear wall. At each upper corner of the rear wall 17 there is secured a bracket 42, one leg of which is riveted as at 43, whereas, the other leg projects forwardly and parallel with its side flange 38, the said leg being secured to the side flange by rivets 44. Said forward extending leg of the bracket has a square pivot opening 45 formed therein and the flange 38 is cut away to accommodate said opening. One or more latches, such as 46, are located adjacent the top edge of the rear wall 17 for latching connection with the roof section in a manner similar to the latching of the front panel to the roof section.

Each side wall of the utility house is formed of pivotally connected panels and which in turn are hinged respectively to the front and rear walls. In Figure 13 side panels 18 and 20 are shown as providing one wall, whereas panels 21—22, Figure 1, form the other side wall of the utility house. Each panel may be recessed to provide one or more decorative sections such as 48. The piano type hinge 50 for the panels 18 and 20 includes a member 51 secured to the outside surface of panel 18 by rivets 52 and a similar member 53 is secured to the outside surface of panel 20 by rivets such as 54. The members are pivotally connected by a pivot pin which is best seen in Figure 16.

A similar type hinge is employed for connecting panel 18 to the side flange 36 of the front wall panel 16. As shown in Figure 11, the hinge structure 55 consists of a member 56 secured to flange 36 by rivets 57, and a similar member 58 is secured to panel 18 by rivets 59. The hinge pin 60 pivotally connects the members in a well known manner. A similar piano type hinge 40 is employed for connecting the side panel 20 to flange 38 of the rear wall, as best shown in Figures 7, 8 and 10. This hinge structure consists of a member 62 secured by rivets 63 to the edge of panel 20 and a similar member 64 is secured by rivets 65 to the edge of the flange 38. The hinge pin 66, as shown in Figure 10, pivotally connects the members. The panels 21 and 22 are connected in a similar manner to each other and to the front and rear walls, respectively, with numerals 67 designating the hinge structure for connecting the panels to each other, numeral 68 designating the hinge structure for pivotally connecting panel 21 to the front wall 16, and numeral 41 designating the hinge structure for connecting panel 22 to the rear wall 17. The top edge 70 of each side panel, see Figure 13, is continuous for its full length and said edge is located between a side plate of the gabled roof section such as 85, and an angle member 72 secured by rivets 71 to a roof portion 87 in spaced relation to the side plate but parallel therewith. The parts interengage when the house is in erected condition and the upper edges of the side panels are held to the roof section and also maintained in longitudinal alignment.

In Figs. 14, 15 and 16 additional structure is disclosed for holding the bottom edges of the side panels in alignment when the house is erected and which also function to strengthen and reinforce the side walls of the house. The structure is illustrated in relation to side panels 18 and 20 and essentially consists of an angle member 74 having a bottom horizontal flange 75 and a vertical depending top flange 76. The angle member is pivoted at 77 to the side flange 38 of the rear wall 17 and the member is folded upwardly in parallel relation to the flange 38 to permit collapsing of the utility house. As shown in Figures 14, 15 and 16 the angle member 75 has interlocking engagement with certain channel members 78 which are U-shaped in cross section and which are secured by rivets 79 to the inside bottom edge of the side panels 18 and 20, respectively. Thus, when collapsed, the angle member 74 will rest along a rear corner of the wall 17 and is out of the way to permit folding of the panels. When erected the angle member 74 is moved downwardly to interlock with the channel members 78 fixed to the side panels and the panels are accordingly held in longitudinal alignment, with the side wall also being adequately strengthened and reinforced thereby. A number of openings such as 80 may be formed in the horizontal flange 75 for receiving bolts and thus the house can be anchored to a wood, metal or concrete base.

The gabled roof section 82 is formed of a plurality of plates joined to each other to form a unit and which includes a front plate 83 and a rear plate 84, both of gabled formation and connecting with the side plates 85 and 86. The roof is completed by the roof portions 87 and 88. Corner brackets such as 90 are secured by rivets 91 to the plates 83 and 84 and said brackets are in turn secured by similar rivets to the adjacent plates, such as 85 and 86, and by means of these brackets the roof structure is adequately strengthened and reinforced since the parts 85 and 86 may be formed integral with the sloping top roof portions 87 and 88. For ventilating the interior of the utility house the front gabled plate 83 may be provided with the louver unit 92. The roof section 82 is adapted to rest on the panels comprising the front, rear and side walls of the house when in erected condition, and in order to properly position the gabled roof section on said walls the front section 83, on its inside surface, has secured thereto the stops 93, said stops being suitably riveted to the section by the rivets 94. It will be understood, therefore, that when the roof section 82 is in supported position on the front wall 16 the stops 93 rest on the top edge of the front wall 16 and said parts are maintained in contacting relation by the latches 37, the bails of which are located in latching engagement with the bail holders 95. The latches 46 on the rear wall 17 are also adapted to latch with bail holders 96 suitably secured to the plate section 84 of the roof. However, stop members as such are not required for this rear end of the roof since the pivot structure associated with the square openings 45, previously described in connection with brackets 42, function as stop members for the roof section and also pivotally connect the roof to the rear panel 17. Thus, in accordance with the invention, plates 85 and 86 of the roof are each provided with an inwardly extending pin 97 and said pin is suitably positioned so as to enter the square opening 45 provided by bracket 42 adjacent its side of the rear wall. Each pin 97 is securely fixed to its supporting member of the roof by means of the nut 98.

When the utility house is in erected formation, as shown in Figure 1, the roof section is held to the front and rear wall panels by the latching means 37 and 46, respectively, and the side wall panels interconnect with the roof section by means of the angle members 72. Also the side panels are held in alignment along their bottom edges by the angle members 74. In order to collapse the utility house it is necessary as a first step to lift the roof section. Accordingly, the operator releases the latching means and also swings the members 74 to an inoperative position. These members are located within the house and thus are easily accessible to the operator. The roof section can then be raised to a position, such as illustrated in dotted lines, Figure 2, and as a result thereof the wall panels are free and the same can be folded inwardly, as illustrated in Figures 3 and 4. In this connection, it is important to note the unique function performed by the pivoting means for the roof section and which includes the square-shaped openings 45 provided by brackets 42 and pins 97, which extend through the openings and coact to articulately connect the roof section section to the rear wall panel.

The square-shaped openings, as shown in Figures 7 and 8, are each disposed so that two opposite corners thereof are horizontally aligned and said alignment is approximately parallel with the top edge of the wall panels. A third corner is located below and between the horizontally aligned corners and it will also be observed that the diameter of pin 97 is much smaller than the opening. The distance between the horizontally aligned corners of the square-shaped opening should be at least twice the diameter of the pin, and in the illustrated embodiment the distance is approximately three times the diameter of the pin 97.

Accordingly, the pivot structure between the roof section and the rear wall panel allows for limited movement, both horizontally and vertically of the roof section, with respect to the rear wall panel. With the utility house erected and the roof section clamped to the wall panels, the pin 97 will occupy the third corner of the opening 45, as shown in Figure 8, and which is the lowest corner, so that the pivot structure thus functions as a stop for the roof section. When the roof section is initially raised for purposes of collapsing the utility house, the pin 97 will be moved to the right hand corner of opening 45, as illustrated in Figure 7, and when the utility house is in collapsed condition, with the parts located within the roof section, the pin 97 will be located in the left hand corner of the opening. This freedom of movement which the pivot pin has with respect to the pivot brackets is necessary in order that the roof section may have free movement to a limited extent to facilitate proper functioning in its various operative positions.

The first step in the collapsing of the present utility house is shown in Figure 3, wherein the side wall panels 21 and 22 are folded inwardly. This is followed by an inward folding of the panels 18 and 20, as best illustrated in Figure 4. Since both side wall structures are identical, it is entirely possible to fold panels 18 and 20 inwardly as a first step, followed by similar folding of the panels of the opposite side wall. Referring again to Figure 4, it will be noted that the folding action locates panel 22 adjacent the rear wall panel 17. Panel 21 will then fold into contact with panel 22 and this is followed by panel 20, which will have location adjacent panel 21. Panel 18 will then be located adjacent panel 20 and the compact folded structure will include the front wall 16 which is located on the side opposite rear panel 17. In accordance with the invention, the compact folded structure is then located within the gabled roof section, and, as previously explained, the pivot pins 97 and the pivot brackets 42 are so constructed and arranged as to facilitate this operation. Of course, the size of the rear panel 17 has been predetermined so as to substantially equal the open bottom of the gabled roof section and when the compact folded structure is moved up into the roof section, rear panel 17 forms the bottom member thereof and substantially closes the open bottom of the roof section.

For maintaining the utility house in a collapsed condition with the walls folded within the gabled roof section it is convenient to provide releasable fastening elements in the form of brackets 100 having slidable bolts 101, the brackets being fixed in position, as shown in Figure 6, to the side plates 85 and 86 of the gabled roof section. A steel brace 102 for each fastening element extends across the rear wall panel to strengthen it and bolt brackets 103 are attached to each end of these supports. A bolt bracket 103 is accordingly associated with each bolt 101 and with the rear wall panel in closed position the bolts are moved outwardly and caused to enter and engage its bolt bracket, thus maintaining the wall panels within the gabled roof section and rendering it safe to transport the structure without danger of unfolding.

Also to facilitate the carrying and transporting of the utility house when collapsed and folded within the gabled roof section, the invention provides carrying handles 105 which are fixed to rivets 106 to the corners of the gabled roof section. More particularly two handles are fixed to and they project from the front plate 83, whereas two handles are also fixed to and which project from the rear plate 84.

The invention is not to be limited to or by details of construction of the particular embodiment thereof illustrated by the drawings, as various other forms of the device will of course be apparent to those skilled in the art without departing from the spirit of the invention or the scope of the claims.

What is claimed is:

1. In a collapsible utility house, the combination including a front wall panel having a rearwardly directed flange along each side, a rear wall panel having a forwardly directed flange along each side, side walls each comprising a pair of panels, a gabled roof section, a piano type hinge structure pivotally securing the panels of each side wall to each other, similar hinge structures pivotally securing one panel of each pair to the rearwardly directed flanges of the front wall panel and pivotally securing the other panel of each pair to the forwardly directed flanges of the rear wall panel, a pivot bracket secured to the rear wall panel at each side edge thereof immediately adjacent the top edge of the panel, said brackets each having a leg extending forwardly and parallel with a side flange of the rear wall panel, said forwardly extending bracket leg having a square-shaped opening therein, and a pivot pin carried by the roof section on each side thereof adjacent the rear, said pins extending inwardly of the roof section and through the square-shaped openings respectively of the pivot brackets, whereby the pins coact with the pivot bracket in a manner to pivotally connect the roof section to said rear wall panel and to additionally provide for limited movement both horizontally and vertically of the said roof section with respect to the rear wall panel.

2. A collapsible utility house as defined by claim 1, wherein the square-shaped openings are so disposed when the walls are in erected position that two corners of the openings are approximately in horizontal alignment and which is parallel to the top edge of the panels with a third corner being located between and below, and wherein the distance between the horizontally aligned corners is at least twice the diameter of the pin coacting therewith.

3. In a collapsible utility house, the combination including a front wall panel, a rear wall panel, side walls each comprising a pair of panels pivoted to each other and to the front and rear wall panels respectively, and a gabled roof section, said front wall panel having a door opening therein and a door for the opening pivotally secured to the panel, the means pivotally connecting the side wall panels to each other and to the front and rear panels comprising hinge structures of the piano hinge type extending vertically along the sides of the panels when the walls are in erected position, whereby said side wall panels may be folded inwardly in overlapping relation for collapsing the walls against the rear wall panel, a pivot bracket secured to the rear wall panel at each side edge thereof and immediately adjacent the top edge of the panel, and a pivot pin carried by the roof section on each side thereof adjacent the rear, said pins extending inwardly of the roof section and coacting with the pivot brackets respectively for pivotally connecting the roof section to said rear wall panel, whereby the said walls when in collapsed condition will fold into the gabled roof section with the rear wall panel providing the bottom member and substantially closing the open bottom of the roof section.

4. In a collapsible utility house, the combination including a front wall panel having a rearwardly directed flange along each side, a rear wall panel having a forwardly directed flange along each side, side walls each comprising a pair of panels, a gabled roof section, a piano type hinge structure pivotally securing the panels of each side wall to each other, similar hinge structures pivotally securing one panel of each pair to the rearwardly directed flanges of the front wall panel and pivotally securing the other panel of each pair to the forwardly directed flanges of the rear wall panel, a pivot bracket secured to the rear wall panel at each side edge thereof and immediately adjacent the top edge of the panel, said brackets each having a leg extending forwardly and parallel with a side flange of the rear wall panel, said forwardly extending bracket leg having a square-shaped opening therein, and a pivot pin carried by the roof section on each side thereof adjacent the rear, said pins extending through the openings in the pivot brackets respectively and coacting therewith to pivotally connect the roof section to said rear wall panel, whereby the said hinge structures permit a folding of the side wall panels inwardly into an overlapping relation with each other and with the front and rear wall panels for collapsing the structure, and whereby the pivotal connection of the roof section with the rear wall panel permits a folding of the collapsed structure into the roof section.

5. In a collapsible utility house, the combination including a front wall panel, a rear wall panel, side walls comprising a pair of panels vertically pivoted to each other and to the front and rear wall panels respectively, and a roof section of gabled shape, said roof section including front and rear plates of gabled shape, sloping roof portions, and vertically disposed side portions, the means pivotally securing the side wall panels to each other and to the front and rear wall panels comprising hinge structures of the piano hinge type, a pivot bracket secured to the rear wall panel at each side edge thereof and immediately adjacent the top edge of the panel, a pivot pin carried by each side portion of the roof section adjacent the rear thereof, said pins extending inwardly of the roof section and coacting with the pivot brackets respectively for pivotally connecting the roof section to the rear wall panel, means provided by the roof section adjacent each side portion thereof for interengaging relation with the top edge of each of the side wall panels respectively, a channel member fixed to each of the side wall panels adjacent the bottom thereof, and an angle member having pivoted securement to the rear wall at each side thereof and adapted to interconnect with the channel members respectively when operatively positioned for maintaining the side wall panels in longitudinal alignment and for strengthening the bottom portion of the side walls when the house is in erected condition.

6. In a collapsible utility house, the combination including a front wall panel, a rear wall panel, side walls each comprising a pair of panels vertically pivoted to each other and to the front and rear wall panels, respectively, and a roof section including gabled walls each terminating in a depending side plate, said front wall panel having a door opening therein and a door in the opening pivotally secured to the panel, a pivot bracket secured to the rear wall panel at each side thereof and adjacent the top edge of the panel, a pivot pin carried by the roof section on each side adjacent the rear and coacting with the pivot brackets for pivotally connecting the roof section to the rear wall panel, channel members fixed to the panels of each side wall along the bottom edge thereof, an angle member pivoted to the rear wall at each side near the bottom edge and when operatively positioned having interlocking relation with the channel members respectively, for aligning the panels in the direction of the side walls and which additionally strengthens and reinforces the side walls when in erected condition, each angle member when inoperatively positioned extending vertically and parallel to the rear wall, and a second angle member fixed to each gabled wall of the roof section on the inside thereof and in spaced relation with the depending side plate of the same, whereby the top edge of the side wall panels when erected are respectively located in a space thus formed by a second angle member and a side plate of the roof section.

7. In a collapsible utility house, the combination including a front wall panel, a rear wall panel, side walls comprising a pair of panels vertically pivoted to each other and to the front and rear wall panels respectively, and a roof section of gabled shape, said roof section including front and rear plates of gabled shape, sloping roof portions, and vertically disposed side portions, hinge structures of the piano hinge type for pivotally securing the side wall panels to each other and to the front and rear wall panels, a pivot bracket secured to the rear wall panel at each side edge thereof and immediately adjacent the top edge of the panel, a pivot pin carried by each side portion of the roof section adjacent the rear thereof, said pins extending inwardly of the roof section and coacting with the pivot brackets respectively for pivotally connecting the roof section to the rear wall panel, means depending from the sloping roof portions adjacent each side portion of the roof for interengaging relation with the top edge of its respective side wall when in erected condition, a channel member fixed to each of the side wall panels adjacent the bottom thereof, an angle member having pivoted securement to the rear wall at each side thereof and adapted to interconnect with the channel members respectively when operatively positioned for maintaining the side wall panels in alignment and for strengthening the bottom portion of the side walls when the house is in erected condition, the angle members each having an inoperative vertical position disposed adjacent a corner of the rear wall to permit collapsing of the house, and each angle member including a bottom flange and which is horizontally disposed when the members are in operative position for anchoring the house to a fixed support.

References Cited in the file of this patent

UNITED STATES PATENTS

| | | |
|---|---|---|
| 1,260,697 | Monroe | Mar. 26, 1918 |
| 2,245,465 | Cole | June 10, 1941 |
| 2,533,683 | Neuhaus | Dec. 12, 1950 |
| 2,701,038 | Mooney | Feb. 1, 1955 |

FOREIGN PATENTS

| | | |
|---|---|---|
| 399,286 | Great Britain | Oct. 5, 1933 |
| 640,518 | Great Britain | July 19, 1950 |
| 262,120 | Italy | Jan. 9, 1929 |
| 329,455 | Germany | Nov. 26, 1920 |